United States Patent [19]

Loftus

[11] Patent Number: 5,036,452
[45] Date of Patent: Jul. 30, 1991

[54] CURRENT SHARING CONTROL WITH LIMITED OUTPUT VOLTAGE RANGE FOR PARALLELED POWER CONVERTERS

[75] Inventor: Thomas P. Loftus, Garland, Tex.

[73] Assignee: AT&T Bell Laboratories, Murray Hill, N.J.

[21] Appl. No.: 458,009

[22] Filed: Dec. 28, 1989

[51] Int. Cl.⁵ .................................................. H02M 3/335
[52] U.S. Cl. ........................................ 363/71; 307/58; 307/82; 363/21
[58] Field of Search ...................... 307/58, 82; 363/19, 363/21, 65, 71; 323/272

[56] References Cited

U.S. PATENT DOCUMENTS

| | | | |
|---|---|---|---|
| 4,276,590 | 6/1981 | Hansel et al. | 363/71 |
| 4,748,340 | 5/1988 | Schmidt | 363/71 |
| 4,912,621 | 3/1990 | Kobayashi et al. | 363/21 |
| 4,924,170 | 5/1990 | Henze | 363/71 |

FOREIGN PATENT DOCUMENTS 293168 12/1986 Japan .
222659 9/1989 Japan .
959054 9/1982 U.S.S.R. ............................ 323/272

OTHER PUBLICATIONS

"Apparatus for Automatic Load Sharing Among Paralleled Converters" by G. W. Wester and Colonel W. T. McLyman, NASA Technical Report N76–26393/8.

Primary Examiner—William H. Beha, Jr.
Attorney, Agent, or Firm—A. G. Steinmetz

[57] ABSTRACT

Current sharing between paralleled power converters is attained by adjusting the error signal in the converters regulation circuit to assure that all the paralleled converters have a regulated output voltage that forces the converters to share the load equally. In particular circuitry is provided to limit the variation in output voltage that can be achieved through operation of the current sharing control.

8 Claims, 2 Drawing Sheets

CURRENT SHARING CONTROL WITH LIMITED OUTPUT VOLTAGE RANGE FOR PARALLELED POWER CONVERTERS

FIELD OF THE INVENTION

This invention relates to power conversion circuits and in particular to load sharing between power circuits connected in parallel to a common load, in order to provide continuous redundant power to this load.

BACKGROUND OF THE INVENTION

Power conversion circuits connected in parallel often share a common load unequally in the absence of load sharing control. These discrepancies are a result of slight difference in the regulated output voltage of each individual converter causing one of the converters to supply nearly all of the load current.

Load current control feedback arrangements are used to constrain these paralleled power converters to supply substantially equal currents to a load. In one illustrative arrangement (U.S. Pat. No. 4,276,590) current sharing between power converters connected in parallel to a common load is accomplished by detecting a difference in currents between the parallel converters and varying the duty cycle of the power swtiches to maintain load current sharing between the paralleled power converters.

A similar load current control is disclosed in NASA technical report N76-26393/8 which discloses a method and apparatus for automatic load sharing among paralleled converters. A current summing and imbalance detecting circuit generate a difference signal combined with the regulating feedback signal of each converter to achieve load current sharing among the paralleled converters.

In many applications converters are paralleled for reliability, redundancy and continuity of power to the output bus. In these applications, the probability of bus voltage excursions and glitches must be minimized. These enumerated and other similar arrangements however respond to connection and disconnection transients and fault conditions with considerable output bus voltage excursions. A considerable bus voltage excursion could occur if one of the paralleled power converter's output or paralleling circuit is suddenly disconnected or connected or if one of the paralleled converters is turned on or off. Also a considerable bus voltage excursion could occur if the paralleling bus is shorted.

SUMMARY OF THE INVENTION

Current sharing between paralleled power converters is attained by monitoring the load current sharing and adjusting the error amplifier input signal in the converters regulation circuit to assure that all the paralleled converters have a regulated output voltage that forces the converters to share the load equally. In particular the circuitry is operative to limit the variation in output voltage that can be achieved through operation of the current sharing control.

A voltage proportional to the imbalance in current in paralleled power converters is applied through a magnitude limiting amplifier to the error amplifier input of each power converter. The amount of output bus voltage change that can occur as a result is limited by the saturation limit of the amplifier and by the value of the resistor limiting the output current of the amplifier. These components can be designed so that the maximum output change can be comparable to the worst case deviation of the output voltage set-point. This deviation is typically on the order of 2% of the nominal output voltage.

The use of this amplifier permits the error amplifier to respond immediately to small output voltage imbalances. In addition, this circuit will not cause large voltage distortions when there is a transient or fault condition on the paralleling bus or when there is a large output current imbalance.

DETAILED DESCRIPTION

Figure 1:
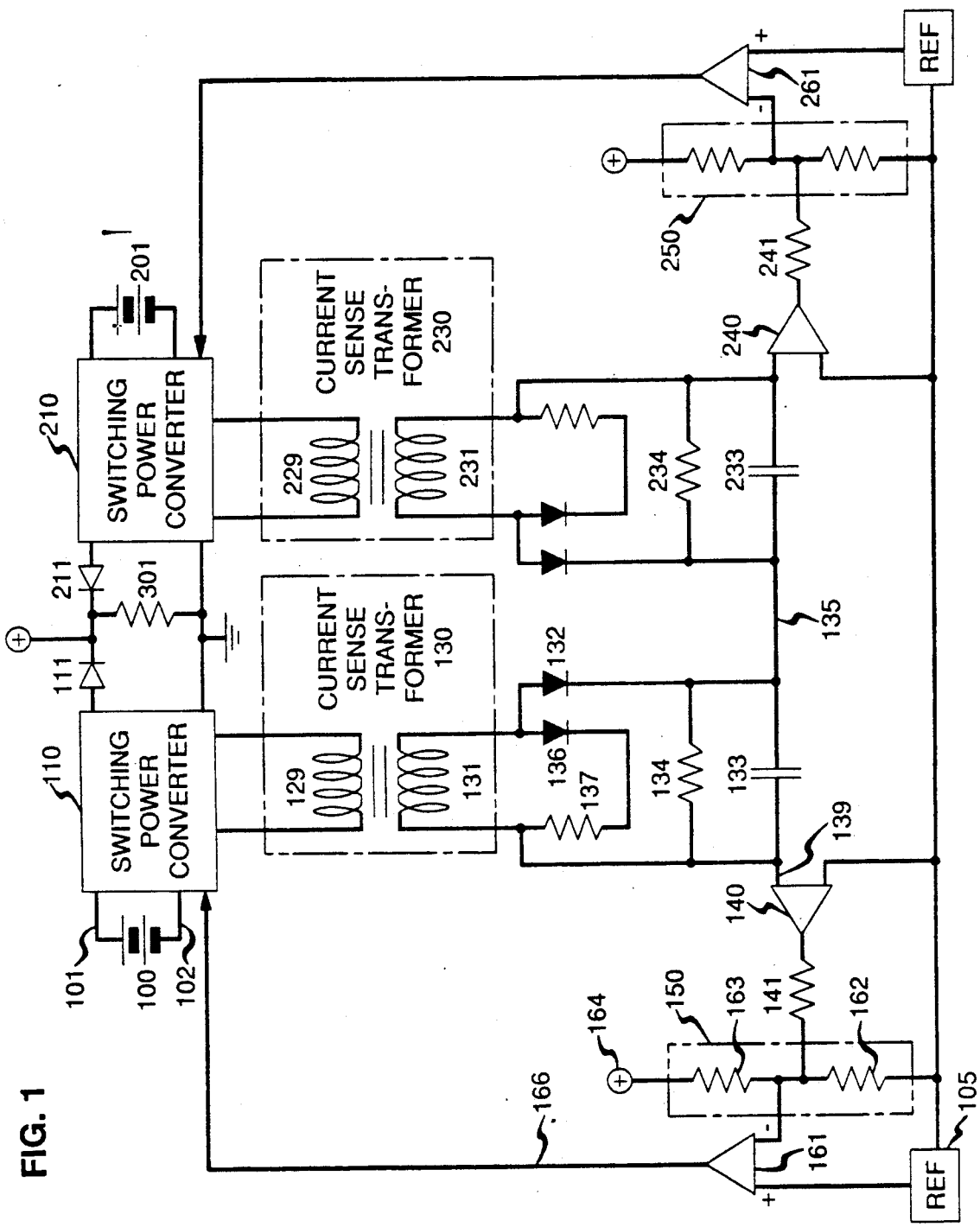
FIG. 1 is a schematic of two paralleled power converters with control circuitry to enable load current sharing and constrain bus voltage excursions according to the principles of the invention.

An illustrative power system including first and second power converters 110 and 210 connected in parallel to a common load is shown in FIG. 1. Current sharing of the current supplied by each power converter to the load is controlled by a feedback arrangement that alters the duty cycle of a power switching device in each power converter to constrain each power converter to deliver substantially equal current outputs.

A DC input voltage source 100 is applied to the input terminals 101 and 102 of the first power converter 110. The output is connected through an ORing diode 111 to a load schematically shown as a resistor 301. This load 301 may be a bus or other load network which is supplied by more than one power converter.

The second power converter 210 is also connected to the common load 301 via an ORing diode 211. Power converter 210 is substantially identical to the first power converter 110. The input voltage supply 200 to power converter 210 may or may not be the same voltage input that supplies power converter 110.

The current flow of each power converter 110 and 210 is sensed by the current sensing transformers 130 and 230, respectively. Each power converter has an identical feedback arrangement which is operative in accord with the principles of the invention to enable output current sharing between the two converters and to constrain the resulting output bus voltage excursion.

A current sensing winding 129 is connected to sense a current flow in a power switching device of the power converter 110. The winding 129 is a primary winding of sensing transformer 130. A secondary winding 131 supplies an AC current representative of the AC current in the power converter 110. The secondary winding 131 is connected through a diode 136 to a small value resistor 137 operative to assure that the secondary winding develops a peak voltage proportional to the peak current in the power converter.

A second diode 132 connects the secondary winding 131 to a relatively large time constant circuit comprising a paralleled resistor 134 and capacitor 133. This network will maintain a DC voltage on the capacitor 133 proportional to the peak current in the power converter 110. Resistor 234 and capacitor 233 similarly maintain a DC voltage proportional to the current in power converter 210. The series connection of capacitor 133 and capacitor 233 result in voltages at leads 139 and 239 proportional to the difference between the currents of the two power converters 110 and 210.

Lead 139 connects the signal proportional to the difference in current to a magnitude limiting inverting amplifier 140. Amplifier 140 may be a simple diode transistor amplifier. The amplifier 140 is inserted in the feedback loop to increase feedback gain and hence sensitivity to small load current differences. It is also has a limited output range so that it is sensitive to large differences that occur during transients.

Amplifier 140 applies its output signal to the input of the error amplifier 161 and to the central node of the bus voltage sensing divider 150 through a resistor 141 that limits the maximum magnitude of the change in the output bus voltage. If a voltage feedback loop is included for each power converter circuit, its voltage signal representative of the output voltage would be applied through the voltage divider 150 to the inverting input of error amplifier 161. In the power converter circuit 110 it would be applied to terminal 164 and summed with the output of amplifier 140.

The non-inverting input of error amplifier 161 is connected to the reference voltage source 105. The error voltage output generated by the error amplifier 161, responsive to amplifier 140, is connected to the power converter in order to control magnitude of the output of the converter.

The polarity of the current sensing circuitry, the inverting amplifier and the error amplifier all result in feedback of the proper polarity to ensure that the differences in output will be corrected. The polarity of any two may be inverted while still maintaining the proper feedback polarity to effect load sharing.

An identical control arrangement is included with the power converter 210 and includes the peak voltage detection circuitry including capacitor 233, the high gain magnitude limiting amplifier circuit 240, and the error amplifier 261.

Figure 2:
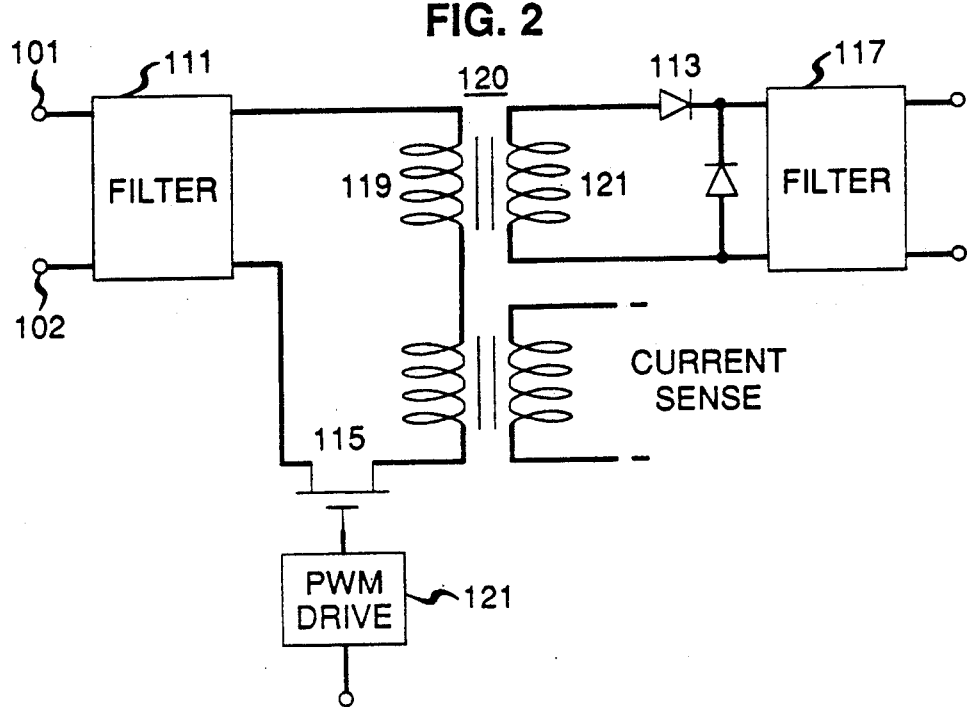
FIG. 2 is a schematic of a power converter circuit suitable for use as a power converter connected to a load in parallel with other power converters as shown in FIG. 1.

A power converter suitable for application to the parallel power system of FIG. 1 is disclosed in FIG. 2. The power converter circuit of FIG. 2 has a DC voltage input at input terminals 101 and 102.

The power converter 110 includes an input filter 111 which is connected to a power switching circuit including a MOSFET power switchin device 115 and the primary winding 119 of a power transformer 120. A secondary winding 121 is connected, via rectifying diode 113, to an output filter 117 which in turn is connected to a load or bus shown as resistor 301 in FIG. 1. This load may be a bus or other load network which is supplied by more than one power converter.

The MOSFET power switching device 115 in power converter 110 is controlled by a feedback control that operates in response to the peak current attained by the MOSFET power switching device 115 in each cycle. The peak current attained is controlled by periodically switching MOSFET power switching device non-conducting when a peak current level is detected. This switching is in response to the pulse width modulated drive circuit 121, which is responsive to error amplifier 161 shown in FIG. 1.

Figure 3:
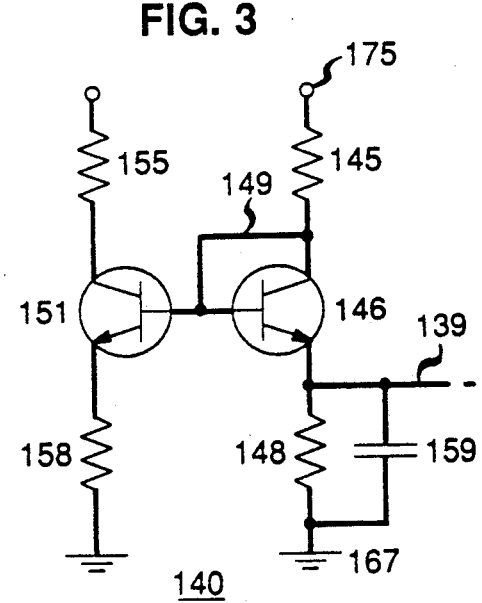
FIG. 3 is a schematic of an amplifier circuit used in the feedback shown in FIG. 1.

A transistor diode amplifier suitable for use as the amplifier 140 and 240 shown in FIG. 1, is schematically shown in FIG. 3. This amplifier has a current mirror configuration and provides both the needed limiting function to prevent bus voltage glitch and a high gain provide the sensitivity to small load current differences.

Lead 139 is connected to the peak voltage storage capacitor 133 as shown in FIG. 1. Amplifier circuit 140 includes a NPN transistor 146 having its collector connected to its lead base by lead 149. Its collector is also connected to a supply voltage at terminal 175, via a resistor 145. Its emitter is connected to a ground return 167, via a resistor 148. Resistor 148 is shunted by a voltage storage capacitor 159 which is connected by lead 139 to the voltage storage capacitor 133 (shown in FIG. 1).

The base of transistor 146 is connected to the base of a transistor 151. A resistor 155 connects the collector of transistor 151 to the inverting input of an error amplifier 161 (shown in FIG. 1). Its emitter is connected to the ground return 167, via resistor 158.

The inverting input of error amplifier 161 (shown in FIG. 1) is also connected to the central node of a voltage divider 150 including resistors 162 and 163. Resistor 163 is connected to a voltage at terminal 164 which may be a voltage regulation control voltage. Resistor 162 is connected to the return ground. Its non-inverting input is connected to the reference voltage source 105. The error voltage output generated by the error amplifier 161 is coupled by lead 166 to a pulse width modulation drive 121 (as shown in FIG. 2) in order to control a duty cycle of the power conversion circuit 110.

The amplifier 140 shown in FIG. 3 operates as a current mirror. By controlling the current in the transistor 151 in response to the current in transistor 146 the voltage applied to the inverting input of error amplifier 161 is modified to achieve a load current balance between power converters 110 and 210.

What is claimed is:

1. A power system including first and second power conversion circuits energizing a common load, comprising:

means for detecting an imbalance of current output supplied by the first and second power conversion circuits;

the first and second power conversion circuits each including independent reference voltage sources and current control circuits for controlling current output, including;

means responsive to the means for detecting for adjusting a current output by adjusting the current control circuit; and means for limiting responses to current imbalances to prevent a large voltage deviation at the common load including an amplifier with a limited response range selected to obtain a defined limited voltage range of the power conversion circuit and coupled to limit a range of output of the means for detecting an imbalance as applied to the means for adjusting.

2. A power converter adapted for current sharing with like power converters connected to it in parallel, comprising:

a power switch periodically enabled conducting for interconnecting energy from an input to an output;

circuitry for generating a power switch control signal for regulating the energy transfer from the input to the output;

current sensing circuitry for sensing a power current signal of the power converter in an energy transfer from the input to the output;

circuitry for balancing the power current signal with an external power current signal from the like power converters connected to it in parallel to generate a balanced current sense signal; and circuitry for applying the balanced current sense signal to a error amplifier to compare it with a reference signal;

the circuitry for applying including a diode transistor current amplifier including an input diode device and an output transistor device operative for transforming small balance current sense signals into an error signal and limiting large balance current sense signals to limit voltage excursions at the output.

3. A power converter adapted for current sharing as claimed in claim 2, wherein:

the current sensing circuitry includes a current transformer having a current sensing primary winding in series with the power switch and a secondary winding connected to a rectifying diode;

the circuitry for balancing includes:

a storage capacitor for storing a voltage proportional to the power current signal and a discharge resistor connected in a shunt with the storage capacitor, and the storage capacitor having a first plate connected to the rectifying diode and to a circuit node which is in turn connected to a second storage capacitor connected for storing a voltage proportional to a power current of a second parallel connected power converter.

4. A power converter adapted for current sharing as claimed in claim 3 wherein:

a first voltage divider is connected at an input to the error amplifier, and the transistor is connected to vary a division ratio of the voltage divider.

5. A power converter, comprising:

an input for accepting a source of energy and an output for connecting to a load to be energized;

a power switch periodically enabled for enabling energy transfer from the input to the output;

balancing circuitry for controlling current sharing with at least a second additional converter connected to the load including;

circuitry for generating an error voltage responsive to a power current of both the power converter and the additional power converter; and circuitry for controlling a range of error voltage excursion; including:

a range limit circuit for preventing large output excursions if the additional power converter is disconnected from the load, having a diode transistor amplifier having its diode junction biased by a voltage proportional to a load current at the power converter.

6. A power converter as claimed in claim 5, wherein:

the balancing circuitry includes a capacitor connected to form a capacitive voltage divider with a capacitor associated with a second power converter connected to the load.

7. A power system including first and second power conversion circuits energizing a common load, comprising:

means for detecting an imbalance of current output supplied by the first and second power conversion circuits;

the first and second power conversion circuits each including current control circuits for controlling current output, including:

means responsive to the means for detecting for adjusting a current output by adjusting the current control circuit; and means for limiting responses to current imbalances to prevent a large voltage deviation at the common load, having: an amplifier comprising first and second transistor devices connected in a current mirror circuit arrangement; and the second transistor is connected to control an error signal applied to the means for adjusting;

the second transistor is connected to control an error signal applied to the means for adjusting.

8. A power system as claimed in claim 7, wherein the means for detecting comprises first and second storage capacitors connected to a common node and being charged to a voltage representing a peak current in the first and second power conversion circuits, respectively.

* * * * *